March 29, 1960 — N. E. RODGERS ET AL — 2,930,696
FOOD PRODUCT AND METHOD OF MANUFACTURE
Filed July 17, 1956
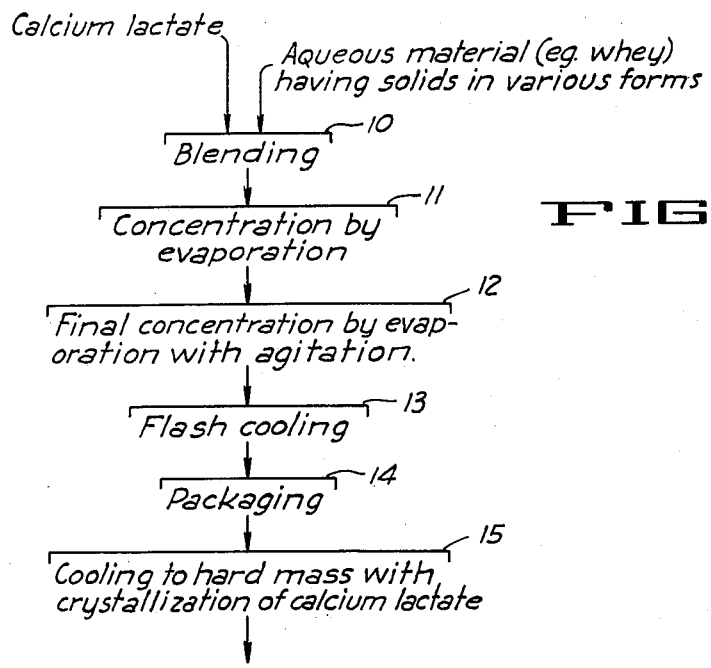
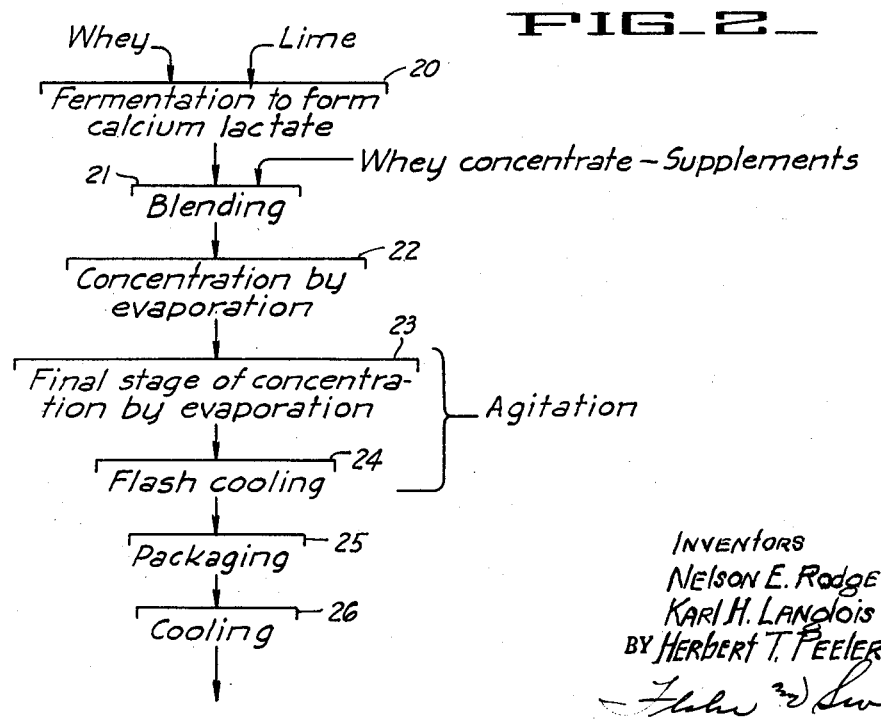
INVENTORS
Nelson E. Rodgers
Karl H. Langlois
BY Herbert T. Peeler
ATTORNEYS

United States Patent Office 2,930,696
Patented Mar. 29, 1960

2,930,696

FOOD PRODUCT AND METHOD OF MANUFACTURE

Nelson E. Rodgers, Larkspur, Calif., and Karl H. Langlois and Herbert T. Peeler, Appleton, Wis., assignors, by mesne assignments, to Foremost Dairies, Inc., San Francisco, Calif., a corporation of New York Application July 17, 1956, Serial No. 598,440

4 Claims. (Cl. 99—2)

This invention relates generally to moist food products in solid form, and methods for manufacturing the same.

For animal feeding purposes it is frequently desirable to provide a product in solid form, containing nutrients such as carbohydrates and protein, and with a relatively high moisture content of the order of from 30 to 60 percent. One of the problems involved in the production of such a product is the attainment of a desired hardness, particularly when inexpensive source materials are used, such as whey or whey products. At a solids content of about 55 percent, ordinary whey (such as results from the manufacture of cheese or casein) tends to be of mush-like consistency with relatively large lactose crystals.

In general, it is an object of the present invention to provide a novel method for the manufacture of a moist food product in solid form, having a texture and hardness such that it is attractive to animals.

Another object of the invention is to provide a method of the above character which permits consistent control over the hardness of the final product.

Another object of the invention is to provide a method of the above character which makes use of calcium lactate in a particular manner to obtain the hardness desired in the final product.

Another object of the invention is to provide a novel method for the manufacture of a moist animal food product in the form of a solid concretion, containing mainly whey solids, and suitable for animals such as swine.

A further object of the invention is to provide a novel food product resulting from the foregoing method.

Additional features and objects of the invention will appear from the following description in which the preferred embodiment has been set forth in detail in conjunction with the accompanying drawing.

Referring to the drawing:

Figure 1 is a flow sheet illustrating the general steps employed in carrying out our method.

Figure 2 is a more detailed flow sheet showing the use of whey and calcium lactate.

In accordance with the present invention, we add calcium lactate to an aqueous material having nutrients (e.g. carbohydrates and protein) such as are desired in the final product. The blended material is then subjected to concentration by evaporation, to reduce the moisture content to the value desired in the final product. The final stage of evaporation is carried out in such a manner that all of the calcium lactate is in solution, with the solution being supersaturated with respect to the temperature to which the concentrate is subsequently cooled. The concentrate is then flash cooled with agitation and immediately thereafter introduced into packages or molds for further cooling to room temperature. During final cooling the calcium lactate forms relatively small (i.e. microscopic) needle-shaped crystals which provide a crystalline framework or meshwork within which other food solids (e.g. viscous protein) are entrained as a matrix.

While it is possible to use various source materials as will be presently explained, a material which is particularly desirable is commercial whey such as is produced as a by-product in the manufacture of cheese and casein. Assuming the use of whey, the method can be carried out substantially as illustrated in Figure 1. Step 10 represents the blending of whey with calcium lactate. In Step 11 the blend is subjected to concentration by vacuum evaporation, followed by a final stage 12 of vacuum evaporation to produce a viscous concentrate that may contain from 40 to 60 percent solids. Thereafter the concentrate is subjected to flash cooling at 13, followed by packaging 14, and gradual cooling at 15 to room temperature. The package may be of substantial size whereby final cooling may require 24 hours or more to complete.

Commercial whey contains substantial amounts of lactose, together with milk protein (mainly albumin) which becomes viscous at concentrations of the order of 55 percent. Raw liquid whey may be supplied to the blending step 10, or it may have been previously concentrated by vacuum evaporation to, say from 35 to 45% solids. Sufficient calcium lactate is added in step 10 to obtain the desired degree of hardness in the final product. Good results have been secured by using an amount of calcium lactate whereby with respect to the total solids present (dry basis) in the blended material, from 15 to 45 percent is calcium lactate (anhydrous basis). The calcium lactate may be added as an aqueous solution, with or without other solids that are compatible with the desired final product.

Concentration by vacuum evaporation in step 11 can be carried out to produce a concentrate containing from 40 to 45 percent solids, at a discharge temperature level of the order of from 138° to 145° F. Final concentration in step 12 can be carried out to produce a concentrate containing from 45 to 60 percent solids, with the material being delivered at a temperature sufficient to keep the calcium lactate in solution. A temperature of the order of from 150° to 158° F. is adequate for the concentration of calcium lactate ordinarily employed. Some continuous agitation is applied in the final evaporating step, and in general this step is carried out in such a manner as to avoid crystallization of calcium lactate, whereby all of the calcium lactate content is a solution that is supersaturated with respect to the temperature to which the solution is subsequently cooled.

Flash cooling in the step 13 can be carried out by suddenly subjecting the material to a reduced pressure. For example, it can be introduced into a chamber at a partial vacuum such that the material is flash cooled to a temperature of the order of 118° to 125° F. It will thus be seen that the temperature reduction during the flash cooling step is of a magnitude of the order of about thirty Fahrenheit degrees. If desired, flash cooling can be carried out within the evaporator employed for step 12, simply by applying a vacuum to the evaporator, before the material has been discharged. In the flash cooling operation 13, we continue to agitate the material to favor formation of calcium lactate seed crystals of the type predisposing development of a micro-crystalline meshwork of needle-shaped crystals. Otherwise the crystals may grow as granuals, resulting in a mushy consistency in the final product. Such agitation can be carried out by means whereby all parts of the liquid are intimately contacted by the agitator. If cooling is carried out in the last evaporating stage, preferably the evaporator is of a type in which the material is progressed as a film on the walls of heated tubes or a cylindrical chamber, and the walls continuously purged with the aid of scraper means, such as rotating devices carrying chains that engage and scrape over the filmed surfaces.

As the masses within the packages cool to room temperature, crystallization of calcium lactate proceeds to completion. Most of the calcium lactate crystallizes in the pentahydrate form, and therefore, considerable free moisture is absorbed as water of crystallization. The small crystals of calcium lactate form a framework or meshwork which, together with the fact that the amount of free moisture is reduced, provides a desired hardness. The protein content (mainly albumin) of the whey, which is in viscous form, is enmeshed together with other whey solids in the meshwork of the calcium lactate crystals.

The more specific procedure illustrated in Figure 2 is as follows: In this instance an inexpensive source of calcium lactate is prepared by the fermentation of a suitable medium. In step 20 whey is subjected to lactic acid fermentation, with the ferment being progressively neutralized by additions of lime to form calcium lactate. Known techniques can be used for carrying out the fermentation operation. Good results have been secured by using a selected strain of Lactobacillus bulgaricus. As known to those familiar with fermentation operations for the production of lactic acid, other fermenting organisms can be employed such as L. acidophilus, L. caseii, Streptococcus lactis or S. thermophilus. Neutralization is carried out to maintain a pH optimum for lactic acid formation, and in the case of Lactobacillus bulgaricus the control is such as to maintain the material undergoing fermentation at pH 5.5–5.8. Growth promoting supplements can be added, such as about 0.1–0.25 percent of brewers or torula yeast.

In step 21 ferment from step 20 is blended with whey concentrate. This concentrate may contain from 40 to 48 percent solids, and may be either commercial whey concentrated by vacuum evaporation, or whey from which part of the lactose has been removed and then concentrated. For example, instead of this material having a lactose content of about 72 percent (dry solids basis), which is typical of commercial whey resulting from the manufacture of cheese, it may contain about 50 percent lactose. Such whey is commonly referred to in the industry as partially delactosed whey. Additional supplements can be added to the blending operation 21 together with the whey concentrate. For example, vitamins such as riboflavin, niacin, $B_{12}$, and $D_3$ can be supplied at this stage.

The blended material is subjected to concentration by vacuum evaporation in step 22, which may be carried out in one or more stages. The resulting concentrate may contain from 40 to 45 percent solids, and may be delivered from the last stage of the evaporator at a temperature level of the order of from 138° to 145° (optimum 140°) F.

After evaporation in step 22, the material is subjected to a final stage of vacuum evaporation in step 23, which is carried out in such a manner as to insure discharge of the concentrate with all of the calcium lactate and lactose contents in solution. We have found it desirable to accompany the last stage of operation with continuous agitation, which can be accomplished by providing the evaporator with suitable agitating means. The material discharging from this last stage of evaporation can be of a temperature level of the order of from 150° to 158° F. (150° F. optimum) and may have a solids content of the order of from 52 to 57 percent (55 percent optimum).

Immediately after the final stage of evaporation in step 23, the material is subjected to flash cooling at 24 which, as previously stated, can be carried out by suddenly subjecting the material to a reduced pressure. The vacuum (i.e. reduced pressure) is adjusted whereby after such flash cooling, the material is at a temperature level of the order of from 118° to 125° F. (120° F. optimum). The material leaving the flash cooling step 24 is then packaged at 25, preferably in packages which are to be used for marketing the material. Thereafter the packages are permitted to set (step 26) for sufficient time to cool to room temperature.

While we have found it desirable to utilize whey in the fermenting operation 20, it will be evident that other raw materials can be used with the proper selection of a fermenting organism to produce the desired calcium lactate. For example we may use a ferment prepared by using molasses as a source of raw material, and Lactobacillus delbruckii as a fermenting organism.

A particular example, making use of the general procedure outlined in Figure 2, is as follows: 143,000 pounds of cheddar cheese whey containing 6.3 percent solids were concentrated in a multiple effect vacuum evaporator to about 90,000 pounds, containing 10 percent solids. This concentrate, containing a 7 percent solution of lactose (anhydrous basis) was heated to 205° F., pumped to a sterilized fermenter, held for 30 minutes and cooled to about 114° F. The fermentor was then inoculated with about two volume percent of a selected strain of Lactobacillus bulgaricus grown in sterilized whole whey neutralized by an excess of calcium carbonate. The lactic acid was neutralized as developed by continual additions of lime, to maintain a pH of about 5.6. After about 50 hours of incubation at 114° F., about 90 percent of the lactose had been utilized and about 95 percent of the fermented sugar was converted to lactic acid.

A partially delactosed whey, containing 54.5 percent lactose (dry solids basis) was concentrated by vacuum evaporation to produce a 46 percent solids concentrate. A sufficient amount of ferment was blended with the partially delactosed whey concentrate to provide a mixture containing about 30,000 pounds of solids, about 40 percent of the solids being derived from the ferment and the remaining 60 percent from the partially delactosed whey concentrate. At this point, small amounts of riboflavin, niacin, vitamin $B_{12}$ and vitamin $D_3$ were added to the material. The resulting material contained about 32 percent solids, and was subjected to vacuum evaporation to produce a concentrate containing 48 percent solids, at an outlet temperature of about 140° F. This concentrate was pumped to an insulated mixing tank equipped with an agitator to obtain rapid and complete intermixing. It was then supplied to an evaporator of the high concentrate type, equipped with scraping chain agitators, and operated to produce an outlet temperature of 150° F. The material was continuously recirculated through this concentrator. The final concentrate withdrawn for further treatment contained 55 percent solids, and was relatively viscous but free from calcium lactate crystals. After attaining 55 percent solids, the supply of heat to the concentrator was discontinued and the vacuum reduced whereby the material was flash cooled to 120° F. The cooled concentrate was then immediately pumped to a packaging line for introduction into the final packages. Before introducing the material into the packages, 0.4 percent propionic acid was added as a mold inhibitor.

The packages were cube-shaped and lined with polyethylene bags to provide the desired form when ultimately set. These packages were stacked in such a manner as to allow reasonably rapid cooling.

After setting for about five days, all of the material had set to the form of a hard block having a penetrometer reading of about 3.5 centimeters. This hardness is particularly adapted to the feeding of young pigs. The blocks analyzed as follows (dry solids basis):

| | Percent |
|---|---|
| Calcium lactate (anhydrous) | 27.2 |
| Lactose (anhydrous) | 35.3 |
| Protein | 14.4 |
| Ash | 19.0 |

The calcium lactate was present in pentahydrate form. The moisture content of the block was 45 percent (total)

although about 5 percent of the water content was water of crystallization of the pentahydrate.

Upon microscopic examination in polarized light, the body appeared to be a crystalline meshwork, comprising calcium lactate crystals of microscopic fineness and this meshwork or framework enmeshed or entrained the viscous protein and other solids.

It will be evident from the foregoing example that the final product provides a desirable animal feed having a substantial moisture content, but which is relatively hard and of a consistency attractive to animals. In general, the hardness of the block can be adjusted to a desired value by adjusting the amount of calcium lactate used. Assuming the manufacture of a block in accordance with the procedure shown in Figure 2, for the feeding of swine, the percentage of ferment solids in proportion to the solids supplied by way of whey concentrate to the blending step 21, can range from about 25 to about 60 percent. In general, for the feeding of swine it is desirable to have a hardness of the order of from 3.5 to 1.0 centimeters (penetrometer reading) the harder material being suitable for feeding mature hogs, and the softer material for young pigs.

Previous reference has been made to the use of source materials other than whey. For example, we may use synthetic milk formed from soy beans, with or without added nutrients.

We claim:

1. In a method for the formation of a moist food product, the steps of forming an aqueous fluid concentrate containing calcium lactate in solution and nutrient substances at an elevated temperature of at least about 150° F., said fluid concentrate containing between about 15% to 45% calcium lactate on a dry solids basis, the calcium lactate being supersaturated with respect to the temperature to which the solution is subsequently shock cooled, shock cooling the concentrate to a temperature at least 30° F. lower than the initial temperature while agitating the same, and immediately thereafter permitting quiescent masses of the concentrate to cool, whereby the masses are caused to solidify together with crystallization of the calcium lactate to form a rigid mass having a penetrometer hardness on the order of 1.0 to 3.5.

2. A method as in claim 1 in which the shock cooling is from a temperature level of the order of from 150° to 158° F. to a temperature of the order of 118° to 125° F.

3. In a method for the formation of a moist animal food product, the steps of blending whey with calcium lactate, subjecting the blend to evaporation to provide a concentrate containing from 40 to 48 percent solids at a temperature level of the order of from 138° to 145° F., subjecting said concentrate to further evaporation together with agitation to produce a concentrate containing 52 to 57 percent solids, at a temperature level of the order of from 150° to 158° F., the calcium lactate content of the concentrate being in supersaturated solution with respect to a temperature level of from 118° to 125° F., subjecting the concentrate to flash cooling with agitation, whereby it is rapidly cooled to a temperature level of the order of from 118° to 125° F., and then permitting a quiescent mass of the concentrate to cool and to solidify with crystallization of the calcium lactate to form a rigid mass having a penetrometer hardness on the order of 1.0 to 3.5.

4. As a new article of manufacture, a food product formed by the method in claim 1.

References Cited in the file of this patent

UNITED STATES PATENTS

| | | |
|---|---|---|
| 2,465,905 | Meade et al. | Mar. 29, 1949 |
| 2,728,678 | Sharp | Dec. 27, 1955 |
| 2,780,548 | Stamberg | Feb. 5, 1957 |